United States Patent [19]

Lundström

[11] Patent Number: 4,773,018
[45] Date of Patent: Sep. 20, 1988

[54] LIGHT TRACKING AUTOMATIC NAVIGATION SYSTEM

[75] Inventor: Mats Lundström, Mölndal, Sweden

[73] Assignee: BT Carrago Aktiebolag, Partille, Sweden

[21] Appl. No.: 49,976

[22] PCT Filed: Aug. 22, 1986

[86] PCT No.: PCT/SE86/00375
§ 371 Date: May 14, 1987
§ 102(e) Date: May 14, 1987

[87] PCT Pub. No.: WO87/01216
PCT Pub. Date: Feb. 26, 1987

[30] Foreign Application Priority Data

Aug. 22, 1985 [SE] Sweden .................................. 8503908

[51] Int. Cl.⁴ .......................... B62D 1/00; G05B 1/00
[52] U.S. Cl. ................................... 364/443; 318/587; 180/168
[58] Field of Search ............... 364/443, 444, 445, 449, 364/516; 180/168, 169; 318/580, 587; 340/995, 988; 358/103, 108, 109

[56] References Cited

U.S. PATENT DOCUMENTS

| 4,018,405 | 4/1977 | Baker ............................. | 364/423 X |
| 4,309,758 | 1/1982 | Halsall et al. .................. | 364/449 X |
| 4,520,390 | 5/1985 | Paredes et al. ................. | 358/108 |
| 4,706,120 | 11/1987 | Slaughter et al. .............. | 180/168 X |

FOREIGN PATENT DOCUMENTS

| 59-32006 | 2/1984 | Japan . | |
| 59-177614 | 10/1984 | Japan ................................ | 318/587 |
| 59-184917 | 10/1984 | Japan ................................ | 318/587 |
| 60-89213 | 5/1985 | Japan ................................ | 318/587 |
| 60-186910 | 9/1985 | Japan ................................ | 318/587 |
| 60-237508 | 11/1985 | Japan ................................ | 318/587 |
| 61-109113 | 5/1986 | Japan ................................ | 318/587 |
| 1500970 | 2/1978 | United Kingdom . | |

Primary Examiner—Bentsu Ro
Attorney, Agent, or Firm—Merchant, Gould, Smith, Edell, Welter & Schmidt

[57] ABSTRACT

A navigation system for detecting the position and controlling the movement of an automatically guided vehicle (1) comprises at least one light source (4) and at least one detector (5) responsive to the light emitted from the light source (4), the vehicle (1) be accompanied by either the light source (4) or the detector (5). A signal processing unit (10) has memory means (13) in which path control information (12) corresponding to the path (3) of the vehicle is stored, and comparator means (11) adapted to compare the path control information (12) stored in the memory means (13) with positional information produced by the system, in order, when the path control information and the positional information differ, to emit control signals (15) for the movement of the vehicle. The detector (5) is a position-sensitive semiconductor detector having a substantially planar, extended, continuous sensing area (7) and is adapted to receive light within a restricted part (P) of the sensing area of the detector. In response to the detected light, electric signals are produced from which said positional information (9) corresponding to the actual position of the vehicle (1) in at least one direction is derived.

10 Claims, 1 Drawing Sheet

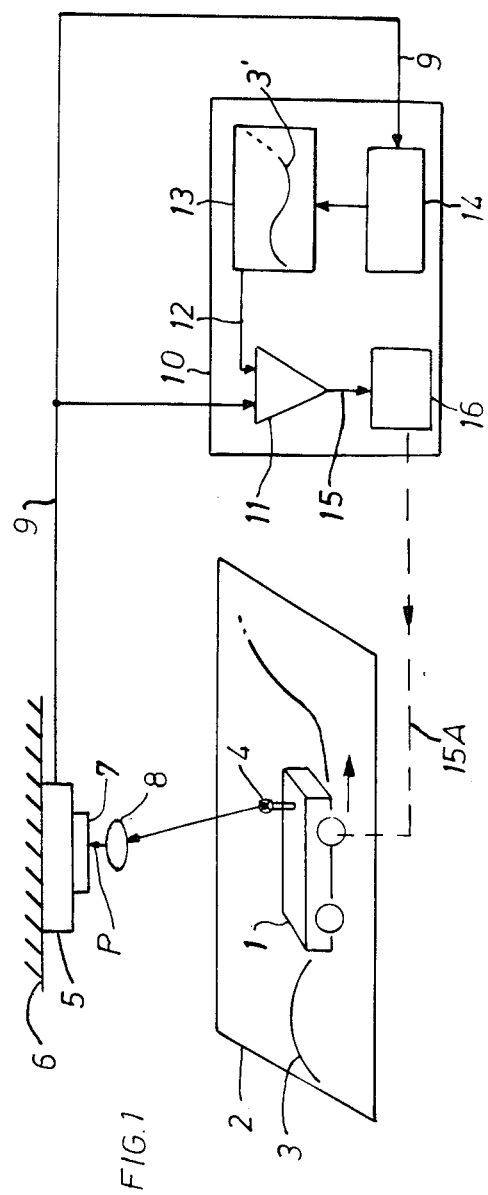
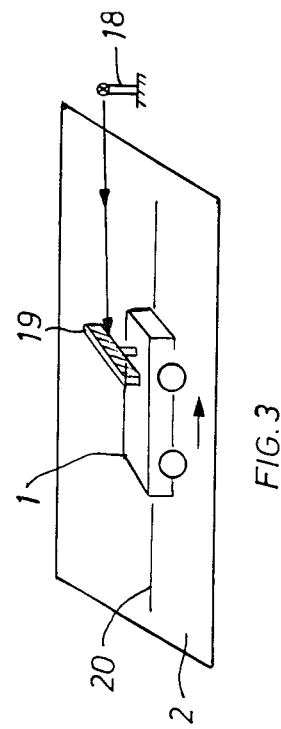
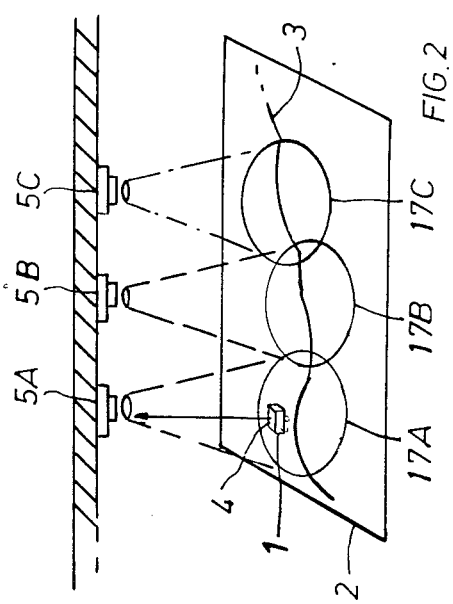

LIGHT TRACKING AUTOMATIC NAVIGATION SYSTEM

TECHNICAL FIELD

The present invention relates to a navigation system for automatically guided vehicles. More particularaly it relates to a navigation system for detecting the position and controlling the movement of a vehicle intended to be automatically guided along a path on a supporting surface such as a floor. The navigation system is comprised of at least one light source and at least one detector responsive to the light emitted from the light source, with one of the light sources and the detector mounted on and accompanying the vehicle and the other of the light sources and the detector being arranged substantially staitonarily in relation to said supporting surface. The system is further comprised of a signal processing unit having memory means in which path control information corresponding to said path is stored, comparator means adapted to compare the path control information stored in the memory means with positional information produced by said system and corresponding to the position of the vehicle on siad supporting surface. When said path control information and said positional information differ from each other, control signals are emitted for controlling the movement of the vehicle. Signal transmission means adapted to transmit said control signals to the vehicle cause it to move along said path.

The generic term "light" as used in the context and in the following description and the accompanying claims should be considered also to comprise parts of the spectrum outside the visible region.

BACKGROUND

Several different methods and devices have been suggested and used in practice for causing an unmanned vehicle (automatically guided vehicle) to move from one destination to another on a factory floor or the like along a predetermined path consisting of a wire or loop of a suitable material disposed along the path. Such a wire may be an induction line, an optically reflective line etc. The vehicle is provided with suitable means for following the wire and for correcting deviations from the predetermined path. Optical wire-tracking systems are disclosed in e.g. GB No. 1,500,970 and DE No. 2,258,764.

Wire guidance systems of the above-mentioned type however suffer from several drawbacks. First, it is often a costly and time-consuming procedure to arrange a new wire or to modify a path already arranged. Secondly, relatively complicated sensor and control devices are required on each vehicle for sensing the wire and guiding the vehicle, which increases costs especially in larger plants. Thirdly, a wire or the like disposed directly on a floor surface may be damaged by external influence or, in the case of an optically reflective wire, may become inoperative because of dust, dirt or the like on the same. Fourthly, such a wire guidance system does not provide an overall survey of all the vehicles in a system, but the wire is used only for guiding the vehicle from one destination to another.

SUMMARY OF THE INVENTION

The object of the present invention is to overcome the drawbacks inherent in the above-mentioned loop guiding method by wholly or partly dispensing with the need of wires or the like in or on the supporting structure on which the vehicle is travelling.

More specifically, the invention has for its object to provide a flexible, optical navigation system for detecting the position of the vehicle and for controlling the movement thereof, especially for controlling the movement of the vehicle along a predetermined path.

Another object of the invention is to provide a navigation system by means of which the predetermined path can easily be established or modified without necessitating any substantial work efforts.

A third object of the invention is to provide a navigation system which can be combined with an already existing wire guidance system.

A fourth object of the invention is to provide a navigation system which permits establishing identity and status of the vehicle (e.g. whether the vehicle carries a load and, if so, what load it is carrying).

These and other objects are achieved by means of a navigation system which is of the type described in the introduction to this specification and which according to the invention is characterised in that the detector is a position-sensitive semiconductor detector having a substantially planar, extended, continuous sensing area, said detector being adapted to receive the light which is emitted from the light source and is then incident on a restricted part of the sensing area of the detector, the position of the vehicle on said supporting surface corresponding to the position of the illuminated part on the sensing area of the detector, said detector further being adapted, in response to the light detected within said restricted part, to emit electric signals indicating where on said sensing area the light emitted from the light source is incident, said positional information which is intended to be compared with the path control information stored in the memory means, being derived from said electric signals emitted by the detector.

By combining such a position-sensitive detector with memory means in which information of the predetermined path is stored, it is possible to achieve an extremely simple and accurate guidance of the vehicle, at the same time as any modification of the path can easily be carried out by changing the contents of the memory means. The signal processing unit of the system according to the invention may consist, for example, of a central computer system monitoring the position and status of all the vehicles in a major plant.

In an especially preferred embodiment, the detector is provided with light-collecting means, such as an optical wide-angle lens system, for focusing the light received from the light source or light sources within said restricted part of the sensing area of the detector.

For detecing the position and controlling the movement of a vehicle on a supporting surface extending in two directions, the light source may accompany the vehicle and one or more detectors of the indicated type may be arranged in the ceiling or the like, each detector covering a respective section of the supporting surface. The light which is then emitted from the light source of a vehicle which is located within a certain section is intercepted by the detector pertaining to that section, the point of incidence of the intercepted light on the sensing area of the detector and the electric signals emitted by the detector corresponding to the position of the vehicle within the section. In the case where the supporting surface is divided into several sections, these may optionally be partly overlapping.

In another embodiment of the invention, the direction of the light emitted from the light source towards the detector may be substantially parallel to the supporting surface and, in such a case, one or more light sources may be stationarily arranged in relation to the supporting surface and the vehicle may carry at least one such detector whose sensing area is extended at least perpendicularly to the direction of movement of the vehicle. In this manner, the navigation system according to the invention can be used especially for guiding a vehicle along a rectilinear path, the light source being disposed e.g. at the end of the path.

In the case where the light source is mounted on board the vehicle, this may be provided with an array of light-emitting points, such as a matrix of light-emitting diodes, these points being separately activable according to a pattern specific to the vehicle. In this case, the detector or detectors are designed to identify a given vehicle on the basis of the identification pattern emitted from the light source thereof, concurrently with the detection of the position of the vehicle and the control of the movement of the vehicle along the predetermined path.

The above-mentioned identification can also be achieved by modulation of the light emitted from the light source of the vehicle.

The signal transmission means of the signal processing unit of the navigation system according to the invention may include means for modulating the light emitted from the light source in the case where the light source is stationary and the detector accompanies the vehicle, or the signal transmission means of the signal processing unit may in a per se known manner include means for converting the control signals into radio signals and means mounted on the vehicle for receiving and converting the radio signals.

In a third embodiment, in which the detector accompanies the vehicle and the light sources are stationary, the light sources are activated depending on which path the vehicle is intended to follow.

A major advantage of the navigation system according to the invention, as compared with wire guidance systems, is that the position of the vehicle can also be determined if the vehicle has deviated substantially from the path, which is not the case in wire guidance systems. If such a system "drops", the vehicle may "run away" from the wire and lose contact with the same. Since it is possible with the detector or detectors in the system according to the invention to cover the entire floor surface, this problem never arises.

BRIEF DESCRIPTION OF DRAWINGS

FIG. 1 schematically shows the design of one embodiment of a navigation system according to the invention.

FIG. 2 illustrates the principle of the division of a floor surface.

FIG. 3 shows a modified embodiment for postional detection and guidance along a rectilinear path.

DETAILED DESCRIPTION OF DRAWINGS

FIGS. 1-3 are consistently numbered, such that element 1 on FIG. 1, is identical to element 1 on FIGS. 2 and 3. FIG. 1, to which reference is now made, illustrates an automatically guided vehicle 1 which is moving on a supporting structure or floor surface 2 along a predetermined path 3. It should here be noted that the path 3 does not consist of a physically laid wire or the like. In the illustrated embodiment, the vehicle is provided with a light source 4, such as a light-emitting diode or a laser, and a detector 5 is mounted in the ceiling 6. Depending on the field of application, it is however possible instead to mount the light source 4 in the ceiling 6 and the detector 5 on the vehicle 1.

According to the invention, the detector 5 is a position-sensitive semiconductor detector having a continuous sensing area 7 extended in two directions and, as schematically shown in FIG. 1, the detector is provided with a wide-angle lens system 8 for focusing the light received from the light source 4 within a restricted part P of the sensing area 7 of the detector 5. In FIG. 1, it is assumed that the lens system 8 is so designed that the sensing area 7 of the detector 5 covers the illustrated surface 2, the position of the vehicle 1 on the surface 2 directly corresponding to the coordinates of the point of incidence P on the sensing area 7.

By using such a detector 5 in combination with a wide-angle lens system 8, it is possible to dispense with the need to rotatably mount the detector 5 in the ceiling. Although the detector is completely fixedly mounted, it is thus able nevertheless to sense the position of a vehicle within a relatively large area of the supporting surface 2.

In response to the light received, the detector 5 generates electric positional information signals 9 which are supplied to an electronic signal processing unit 10, such as a microcomputer or a central computer. The positional information 9 is supplied to one input of a comparator 11 in the signal processing unit 10, the other input of the comparator 11 receiving path control information 12 from memory means 13.

In the memory means 13, e.g. a RAM, path control information is stored which corresponds to the desired and predetermined path 3 and which in the Figure is schematically illustrated by the line 3'. The memory means 13 is further connected to programming means 14 for programming or changing the contents of the memory 13.

In the comparator 11, the positional information 9 received from the detector 5 is compared with the path control information 12 stored in the memory means 13 and, in the case of deviations between the positional information and the corresponding path control information, there is generated at the output of the comparator error or deviation signals 15 which are used for guiding the vehicle 1 towards the desired path 3. For transmitting the control signals 15 to the vehicle 1, the system further comprises signal transmission means which are schematically illustrated in FIG. 1 by a box 16.

The signal transmission means 16 may for instance include a transmitter which converts the control signals 15 into radio signals 15A, and a radio receiver mounted on the vehicle 1.

In an embodiment of special interest in which the detector 5, as opposed to the case of FIG. 1, is instead mounted on the vehicle 1 and the light source or light sources 4 are stationarily arranged in relation to the path 3, the signal transmission means 16 include means for modulating the light emitted from the light source 4 to the detector 5 in dependence upon said control signals 15.

When laying a new path or modifying an existing path, the vehicle 1 can be guided, manually or otherwise, along the desired path at the same time as the positional information 9 generated as described above is supplied via the programming means 14 to the memory means 13 for storing the path control information 3'.

In FIG. 2, it is shown how a plurality of position-sensitive detectors 5A–5C can be used for covering a major surface by dividing it into sections 17A–17C which, optionally, are partly overlapping, the surface of each section 17A–17C being covered by a corresponding detector 5A, 5B and 5C, respectively.

The navigation system according to the embodiment in FIGS. 1 and 2 can also be used in the case where several vehicles 1 each having a light source 4 are simultaneously located within one and the same detector section (e.g. 17A). In this case, only one of the light sources 4 is lit at a time and according to a given sequence, such that the detector 5A on its sensing area 7 only receives light emitted from one vehicle at a time. Each time the light source 4 of a vehicle is lit, it is possible, e.g. by modulating the emitted light, to transmit information from the vehicle 1 to the signal processing unit 10 regarding, for instance, the identity of the vehicle and/or the distance the vehicle has run since its light source was last lit. Obviously, some type of two-way communication between each vehicle and the signal processing unit is necessary for determination of vehicle identity if several vehicles are located within one and the same detector section.

Finally, FIG. 3 illustrates another embodiment of the invention. A number of light sources or "beacons" 18 are fixedly provided along the walls or the like, and at least one detector 19 is mounted on the vehicle 1. In the embodiment illustrated in FIG. 3, the sensing area of the detector 19 is extended at right angles to the direction of movement of the vehicle 1, deviation only at right angles to the rectilinear path 20 being detectable.

It should be pointed out that the invention is not restricted to the embodiments described above and illustrated in the drawings but may be modified in various ways within the claimed scope of protection. Alternatively, the two-dimensional position-sensitive detector 5 in the ceiling 6 may be replaced by two one-dimensional position-sensitive detectors of the same type disposed at right angles to each other. It will also be understood that the signal processing unit 10 described above merely is a schematic and illustrative embodiment which can be modified in several different ways for achieving the same result. The light source 4, 18 in the navigation system may consist of light-emitting diodes, laser systems, filament lamps etc., depending on the field of application.

Finally, it should also be noted that the navigation system according to the invention may advantageously be used in combination with an already existing wire guidance system in such a manner that an automatically guided vehicle at certain locations is detected and guided by means of a navigation system according to the invention and, at other locations, is guided by means of a traditional wire guidance system.

I claim:
1. A navigation system for detecting the position and controlling the movement of a vehicle (1) which is intended to be automatically guided along a predetermined path (3; 20) on a supporting surface (2), such as a floor or the like, said system comprising at least one light source (4; 18) and at least one detector (5; 19) responsive to the light emitted from the light source (4; 18), one of said light source (4; 18) and said detector (5; 19) being mounted on and accompanying the vehicle (1) and the other of said light source (4; 18) and said detector (5; 19) being arranged substantially stationarily in relation to said supporting surface (2), said system further comprising a signal processing unit (10) having memory means (13) in which path control information (12) corresponding to said path (3) is stored, comparator means (11) adapted to compare the path control information (12) stored in said memory means (13) with positional information produced by said system and corresponding to the position of the vehicle (1) on said supporting surface (2), in order, when said path control information and said positional information differ from each other, to emit control signals (15) for controlling the movement of the vehicle (1), and signal transmission means (16) adapted to transmit said control signals (15) to the vehicle (1) to cause it to move along said path (3; 20), c h a r a c t e r i z e d in that the detector (5; 19) is a position-sensitive semiconductor detector having a substantially planar, extended continuous sensing area (7), said detector (5; 19) being adapted to receive the light which is emitted from the light source (4; 18) and is then incident on a restricted part (P) of said sensing area (7), the position of the vehicle (1) on said supporting surface (2) corresponding to the position of the illuminated part of the sensing area (7) on the detector (5; 19), said detector (5; 19) being adapted, in response to the light detected within said restricted part (P), to emit electric signals indicating where on said sensing area (7) the light emitted from the light source (4; 18) is incident, said positional information which is intended to be compared with the path control information (12) stored in said memory means (13), being derived from the electric signals emitted by said detector (5; 19).

2. Navigation system as claimed in claim 1 characterized in that the light source is accompanying the vehicle, said at least one detector is disposed at a distance from said supporting surface in a direction perpendicular to the supporting surface and which each cover a section of said supporting surface, the light emitted from the light source of the vehicle located within a certain section being intercepted by the detector pertaining to said section, and the point of incidence of the intercepted light on the sensing area of the detector and the electric signals emitted by the detector corresponding to the position of the vehicle within said section.

3. Navigation system as claimed in claim 2, c h a r a c t e r i z e d in that said sections (17A–17C) are partly overlapping.

4. Navigation system as claimed in claim 1, wherein the direction of said at least one light source against said at least one detector is substantially parallel to the supporting surface on which the vehicle is moving.

5. Navigation system as claimed in claim 4, c h a r a c t e r i z e d in that said light source or light sources (18) are stationarily arranged in relation to the path (20), and that the vehicle (1) is provided with said detectors whose sensing area (7) is extended at least perpendicularly to the direction of movement of the vehicle (1).

6. Navigation system as claimed in claim 1, in which the light source (4) is accompanying the vehicle (1), c h a r a c t e r i z e d in that the light source (4) is provided with an array of light-emitting points, such as a matrix Of light-emitting diodes, which are separately activable according to an identification pattern specific to the vehicle (1), and that the detector (5) is adapted to identify a given vehicle (1) on the basis of the identification pattern emitted from the light source (4) thereof.

7. Navigation system as claimed in claim 1, in which the light source (4) is accompanying the vehicle (1), c h aracterized in that a specific vehicle (1) is identifiable by modulation of the light emitted from the light source (4), and that the signal processing unit (10) is adapted to demodulate the electric signals emitted by the detector (5) for identifying the vehicle (1).

8. Navigation system as claimed in claim 1, in which the detector (5; 19) is accompanying the vehicle (1), characterized in that the signal transmission means (16) of the signal processing unit (10) comprise means for modulating the light emitted from the light source (4; 18).

9. Navigation system as claimed in claim 1, characterized in that the detector (5; 19) is provided with light-collecting means, such as an optical wide-angle lens system (8), for focusing the light received from the light source (4; 18) within said restricted part (P) of the sensing area (7) of the detector (5; 19).

10. Navigation system as claimed in claim 1, characterized in that the signal processing unit (10) further has means (14) for programming said memory means (13), a desired path (3') being storable in said memory means (13) by manually or moving the vehicle (1) along the desired path (3) and the positional information derived from said electric signals from the detector (5) being at the same time stored by said programming means (14) in said memory means (13).

* * * * *